(12) United States Patent
Suzuki et al.

(10) Patent No.: US 10,885,359 B2
(45) Date of Patent: Jan. 5, 2021

(54) NON-TRANSITORY STORAGE MEDIUM STORING IMAGE TRANSMISSION PROGRAM, IMAGE TRANSMISSION METHOD, IN-VEHICLE DEVICE, VEHICLE, AND IMAGE PROCESSING SYSTEM

(71) Applicant: Toyota Jidosha Kabushiki Kaisha, Toyota (JP)

(72) Inventors: Koichi Suzuki, Miyoshi (JP); Junichiro Igawa, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 190 days.

(21) Appl. No.: 15/964,920

(22) Filed: Apr. 27, 2018

(65) Prior Publication Data

US 2018/0314902 A1 Nov. 1, 2018

(30) Foreign Application Priority Data

Apr. 28, 2017 (JP) ................................ 2017-089695

(51) Int. Cl.
| | |
|---|---|
| *G06K 9/00* | (2006.01) |
| *B60R 11/04* | (2006.01) |
| *B60R 1/00* | (2006.01) |
| *G06F 16/29* | (2019.01) |
| *G06F 16/583* | (2019.01) |
| *G06K 9/46* | (2006.01) |

(52) U.S. Cl.
CPC ............ *G06K 9/00825* (2013.01); *B60R 1/00* (2013.01); *B60R 11/04* (2013.01); *G06F 16/29* (2019.01); *G06F 16/5838* (2019.01); *G06K 9/00818* (2013.01); *G06K 9/4661* (2013.01); *B60R 2300/307* (2013.01)

(58) Field of Classification Search
CPC ............. G06K 9/00825; G06K 9/4661; G06K 9/00818; G06F 16/29; G06F 16/5838; B60R 11/04; B60R 1/00; B60R 2300/307
USPC ......................................... 382/104
See application file for complete search history.

(56) References Cited

U.S. PATENT DOCUMENTS

2005/0209749 A1 * 9/2005 Ito ............................. B60R 1/00
701/36
2008/0136609 A1 * 6/2008 Nakatani .............. B60Q 1/2665
340/425.5

(Continued)

FOREIGN PATENT DOCUMENTS

JP 2014-163814 A 9/2014

*Primary Examiner* — Amandeep Saini
(74) *Attorney, Agent, or Firm* — Dinsmore & Shohl LLP (57) ABSTRACT

A non-transitory storage medium storing an image transmission program that is executed on an in-vehicle device mounted in a vehicle having an illuminance detection unit configured to detect illuminance around the vehicle, an imaging unit configured to acquire an image of surroundings of the vehicle, and a communication unit configured to perform communication with an information center, the image transmission program includes: an image acquisition step of acquiring the image which the imaging unit acquires as an intersection image based on the illuminance which the illuminance detection unit detects at a position in front of the intersection by a predetermined distance; and a transmission step of causing the communication unit to transmit a data representing the intersection image to the information center.

10 Claims, 7 Drawing Sheets

(56) References Cited

U.S. PATENT DOCUMENTS

| | | | |
|---|---|---|---|
| 2013/0241412 A1* | 9/2013 | Ooba | B60Q 1/12 |
| | | | 315/82 |
| 2014/0029791 A1* | 1/2014 | Mori | G06K 9/00791 |
| | | | 382/103 |
| 2018/0182357 A1* | 6/2018 | Yun | H04N 5/58 |
| 2019/0244045 A1* | 8/2019 | Blais-Morin | G06K 9/3216 |

* cited by examiner

| VEHICLE ID | DATA REPRESENTING IRRADIATION RANGE OF HEADLIGHT |
|---|---|
| 001 | G (S, T) |

FIG. 4B

| INTERSECTION ID | LINK ID | LATITUDE/ LONGITUDE | IMAGE ID | HIGH BRIGHTNESS PORTION IMAGE FLAG | MASK IMAGE FLAG |
|---|---|---|---|---|---|
| ID001 | IDL001 | F (X1, Y1) | IM001 | 0 | 0 |
| ID001 | IDL001 | F (X2, Y2) | IM002 | 0 | 0 |
| . | . | . | . | . | . |
| . | . | . | . | . | . |
| . | . | . | . | . | . |

FIG. 4C

| INTERSECTION ID | LINK ID | LATITUDE/ LONGITUDE | IMAGE ID | HIGH BRIGHTNESS PORTION IMAGE FLAG | MASK IMAGE FLAG |
|---|---|---|---|---|---|
| ID001 | IDL001 | F (X1, Y1) | IM011 | 1 | 0 |
| ID001 | IDL001 | F (X2, Y2) | IM012 | 0 | 1 |
| . | . | . | . | . | . |
| . | . | . | . | . | . |
| . | . | . | . | . | . |

NON-TRANSITORY STORAGE MEDIUM STORING IMAGE TRANSMISSION PROGRAM, IMAGE TRANSMISSION METHOD, IN-VEHICLE DEVICE, VEHICLE, AND IMAGE PROCESSING SYSTEM

CROSS-REFERENCE TO RELATED APPLICATIONS

This application claims priority to Japanese Patent Application No. 2017-089695 filed on Apr. 28, 2017, which is incorporated herein by reference in its entirety including the specification, drawings and abstract.

BACKGROUND

1. Technical Field

The present disclosure relates to a non-transitory storage medium storing an image transmission program, an image transmission method, an in-vehicle device, a vehicle, and an image processing system.

2. Description of Related Art

In the related art, in a case where there is an intersection (hereinafter, referred to as a guide intersection) to be guided, such as right or left turn, in front of a vehicle in a moving direction, guidance of the guide intersection is performed. In the above-described case, mark target candidates that are candidates for a mark target to be a mark are acquired, and in a case where a mark target candidate is used as a mark target in the past, appropriateness of the mark target candidate as a mark is determined based on a visual recognition form of an occupant to the mark target candidates accompanied with passing through the guide intersection. A traveling guidance system configured to perform guidance of the guide intersection using a mark target candidate having appropriateness equal to or greater than a reference value as a mark target among the mark target candidates at the guide intersection based on the determination is known (for example, see Japanese Unexamined Patent Application Publication No. 2014-163814 (JP 2014-163814 A)).

SUMMARY

On the other hand, in the traveling guidance system of the related art, there is no disclosure concerning a method of efficiently collecting data of the mark target candidates. In particular, there is no disclosure concerning efficient data collection at an intersection where collection is not needed.

The present disclosure provides a non-transitory storage medium storing an image transmission program, an image transmission method, an in-vehicle device, a vehicle, and an image processing system capable of efficiently collecting an image at an intersection.

A first aspect of the present disclosure relates to a non-transitory storage medium storing an image transmission program that is executed on an in-vehicle device mounted in a vehicle having an illuminance detection unit configured to detect illuminance around the vehicle, an imaging unit configured to acquire an image of surroundings of the vehicle, and a communication unit configured to perform communication with an information center, the image transmission program including: an image acquisition step of acquiring the image which the imaging unit acquires as an intersection image based on the illuminance which the illuminance detection unit detects at a position in front of the intersection by a predetermined distance; and a transmission step of causing the communication unit to transmit a data representing the intersection image to the information center. The information center may be, for example, a traffic information center, a probe center, or the like.

For this reason, an image captured based on illuminance around the vehicle is acquired.

Accordingly, it is possible to provide a non-transitory storage medium storing an image transmission program capable of efficiently collecting an image at an intersection.

A second aspect of the present disclosure relates to an image transmission method including: with an in-vehicle device mounted in a vehicle having an illuminance detection unit configured to detect illuminance around the vehicle, an imaging unit configured to acquire an image of surroundings of the vehicle, and a communication unit configured to perform communication with an information center, acquiring the image which the imaging unit acquires as an intersection image based on the illuminance which the illuminance detection unit detects at a position in front of the intersection by a predetermined distance; and with the in-vehicle device, causing the communication unit to transmit a data representing the intersection image to the information center.

For this reason, an image captured based on illuminance around the vehicle is acquired.

Accordingly, it is possible to provide an image transmission method capable of efficiently collecting an image at an intersection.

A third aspect of the present disclosure relates to an in-vehicle device including: an illuminance detection unit configured to detect illuminance around a vehicle; an imaging unit configured to acquire an image of surroundings of the vehicle; a communication unit configured to perform communication with an information center; and a control device configured to acquire the image which the imaging unit acquires as an intersection image based on the illuminance which the illuminance detection unit detects at a position in front of the intersection by a predetermined distance, and cause the communication unit to transmit a data representing the intersection image to the information center.

For this reason, an image captured based on illuminance around the vehicle is acquired.

Accordingly, it is possible to provide an in-vehicle device capable of efficiently collecting an image at an intersection.

A fourth aspect of the present disclosure relates to a vehicle including: an illuminance detection unit configured to detect illuminance around the vehicle; an imaging unit configured to acquire an image of surroundings of the vehicle; a communication unit configured to perform communication with an information center; and an in-vehicle device including a control device, wherein the control device is configured to acquire the image which the imaging unit acquires as an intersection image based on the illuminance which the illuminance detection unit detects at a position in front of the intersection by a predetermined distance, and cause the communication unit to transmit a data representing the intersection image to the information center.

For this reason, an image captured based on illuminance around the vehicle is acquired.

Accordingly, it is possible to provide a vehicle capable of efficiently collecting an image at an intersection.

A fifth aspect of the present disclosure relates to an image processing system including: an in-vehicle device mounted in a vehicle, the vehicle including an illuminance detection unit configured to detect illuminance around the vehicle, an imaging unit configured to acquire an image of surroundings of the vehicle, and a communication unit configured to perform communication with an information center, and the in-vehicle device including a first control device; and an image processing device provided in the information center, the image processing device including a second control device, wherein: the first control device is configured to acquire the image which the imaging unit acquires as an intersection image based on illuminance which the illuminance detection unit detects at a position in front of the intersection by a predetermined distance, and cause the communication unit to transmit a data representing the intersection image to the information center; and the second control device is configured to receive the data, and construct guide information based on the data.

For this reason, an image captured based on illuminance around the vehicle is acquired.

Accordingly, it is possible to provide an image processing system capable of efficiently collecting an image at an intersection.

According to the aspects of the present disclosure, it is possible to provide a non-transitory storage medium storing an image transmission program, an image transmission method, an in-vehicle device, a vehicle, and an image processing system capable of efficiently collecting an image at an intersection.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an embodiment to which a non-transitory storage medium storing an image transmission program, an image transmission method, an in-vehicle device, a vehicle, and an image processing system are applied will be described.

EMBODIMENT

Figure 1:
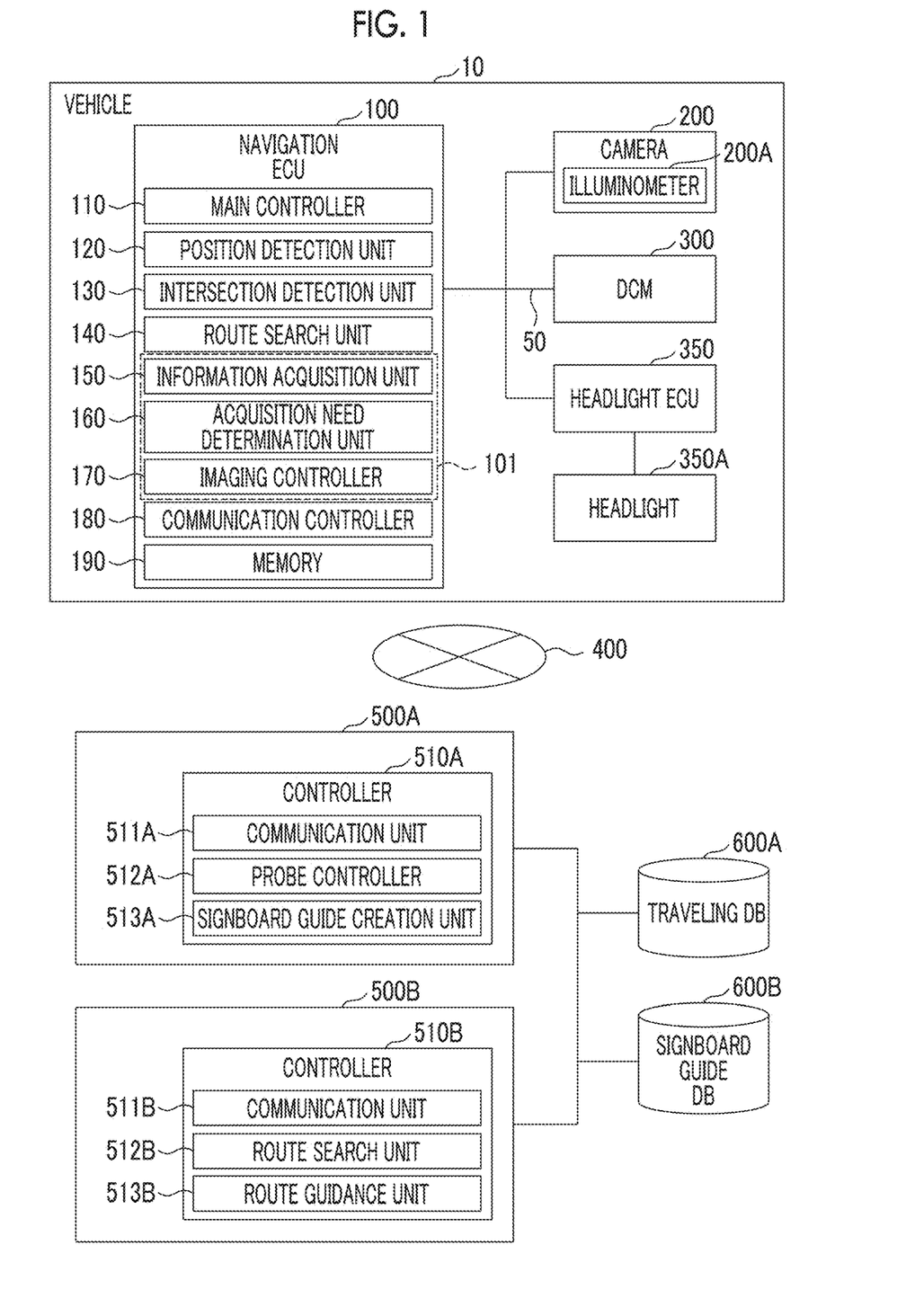
FIG. 1 is a diagram showing the configuration of a route guidance system including a vehicle, a probe storage server, and a navigation server.

FIG. 1 is a diagram showing the configuration of a route guidance system including a vehicle 10, a probe storage server 500A, and a navigation server 500B. In the vehicle 10, a navigation electric control unit (ECU) 100, a camera 200, a data communication module (DCM) 300, a headlight ECU 350, and a headlight 350A are mounted. The navigation ECU 100, the camera 200, the DCM 300, and the headlight ECU 350 are connected to perform communication with one another through a controller area network (CAN) 50 as an example. The navigation ECU 100 can perform wireless data communication with the probe storage server 500A and the navigation server 500B through the DCM 300 and a network 400. The probe storage server 500A and the navigation server 500B are an example of an information center or a data center needed for route guidance.

Although a form in which the CAN 50 based on a CAN protocol is used as a network inside the vehicle 10 has been described, a bus other than a CAN, such as a bus using an Ethernet (Registered Trademark) protocol, may be used instead of the CAN 50. Although various devices or equipment other than the above-described devices or equipment are mounted in the vehicle 10, in FIG. 1, constituent elements particularly related to the embodiment are extracted and shown.

The vehicle 10 is, for example, a hybrid vehicle (HV), a plug-in hybrid vehicle (PHV), an electric vehicle (EV), a gasoline vehicle, a diesel vehicle, or the like. The navigation ECU 100 is mounted in the vehicle 10.

The navigation ECU 100 performs control of a navigation system mounted in the vehicle 10. The navigation ECU 100 includes an image transmission device of the embodiment. Here, description will be provided focusing on a portion relating to the image transmission device in the navigation ECU 100. Here, the image transmission device of the embodiment is an example of an in-vehicle device. The probe storage server 500A is an example of an image processing device. The image transmission device (in-vehicle device) and the probe storage server 500A of the embodiment construct an image processing system.

The navigation ECU 100 is implemented by a computer including a central processing unit (CPU), a random access memory (RAM), a read only memory (ROM), a hard disk drive (HDD), an input/output interface, a communication interface, an internal bus, and the like as an example.

A program that makes the computer as the navigation ECU 100 have a function as an image transmission device is installed on the computer through a computer-readable storage medium or is downloaded from another computer system through a modem or the like connected to the network 400, such as the Internet, and installed on the computer.

The navigation ECU 100 includes a main controller 110, a position detection unit 120, an intersection detection unit 130, a route search unit 140, an illuminance acquisition unit 150, an acquisition need determination unit 160, an imaging controller 170, a communication controller 180, and a memory 190. The main controller 110, the position detection unit 120, the intersection detection unit 130, the illuminance acquisition unit 150, the acquisition need determination unit 160, the imaging controller 170, and the communication controller 180 represent the functions of the program executed by the navigation ECU 100 as functional blocks. The memory 190 functionally represents a portion that stores data like the RAM, the ROM, and the HDD included in the navigation ECU 100. The illuminance acquisition unit 150, the acquisition need determination unit 160, and the imaging controller 170 constitute an image acquisition unit 101.

In the navigation ECU 100, at least the illuminance acquisition unit 150, the acquisition need determination unit 160, the imaging controller 170, the communication controller 180, and the memory 190 constitute the image transmission device. The image transmission device may further include the main controller 110, the position detection unit 120, or the intersection detection unit 130.

The main controller 110 is a processing unit that performs processing other than processing performed by the position detection unit 120, the intersection detection unit 130, the illuminance acquisition unit 150, the acquisition need determination unit 160, the imaging controller 170, and the communication controller 180, and that integrates processing of the navigation ECU 100.

The position detection unit 120 is connected to a global positioning system (GPS) antenna, and acquires position data and time data from GPS signals. The position data acquired by the position detection unit 120 is data representing a current position (latitude and longitude) of the vehicle 10, and the time data is data representing a current time. The position data and the time data are used for processing that is performed by the main controller 110, and are output to the CAN 50.

The intersection detection unit 130 detects an intersection in a moving direction of the vehicle 10 based on the current position of the vehicle 10 and map data (electronic map). Specifically, the intersection detection unit 130 acquires the current position of the vehicle 10 obtained from the navigation system and detects an intersection represented by a node in the moving direction on a link representing a road including the current position in the map data.

The intersection detection unit 130 calculates a distance to the intersection based on the current position (latitude and longitude) of the vehicle 10 obtained from the navigation system and a position (latitude and longitude) of the intersection represented by the node in the moving direction on the link representing the road, on which the vehicle 10 is traveling currently, in the map data.

The route search unit 140 receives information, suck as a destination input to the navigation system by a user of the vehicle 10 and transmits information, such as the destination, and the position data representing the current position of the vehicle 10 to the navigation server 500B. The route search unit 140 fits data of route guidance received from the navigation server 500B to the map data and displays the data on a display of the navigation system. At this time, the route search unit 140 displays a signboard guide image received from the navigation server 500B on the side of an image of the intersection on the display, and displays guide display, such as "turn left of OO intersection" on the display. As described above, since the navigation server 500B searches for a route, it is possible to guide a more accurate route and a more accurate arrival time.

The illuminance acquisition unit 150 acquires data representing the current position and illuminance in front of the vehicle 10 detected by an illuminometer (exposure meter) 200A of the camera 200.

The acquisition need determination unit 160 determines an acquisition need of an image in front of an intersection for the camera 200 based on the current position and the illuminance in front of the vehicle 10 acquired by the illuminance acquisition unit 150. Specifically, the acquisition need determination unit 160 determines that acquisition of an image is not needed in a case where the detected illuminance around the vehicle is less than a threshold Th1, and determines that acquisition of an image is needed in a case where the detected illuminance around the vehicle is equal to or greater than the threshold Th1. The threshold Th1 is a value that is a determination reference for determining whether or not a pixel having brightness equal to or greater than a predetermined value is included in an image acquired by the camera 200, and is a minimum value capable of determining that the image shows something even though dark. In other words, the threshold Th1 is a minimum value at which an image is not blackened. The threshold Th1 described above is a value smaller than a threshold Th2 described below. The threshold Th2 is a boundary value of illuminance between daytime and nighttime.

The reason for determining the acquisition need of the image as described above is as follows: in a case where the image in front of the intersection is acquired by a probe traffic information collection function of the navigation ECU 100 without determining the acquisition need of the image in front of the intersection, the number of images to be acquired increases, the data capacity of image data uploaded from the navigation ECU 100 to the probe storage server 500A becomes enormous, and the capacity of image data stored in the probe storage server 500A and the navigation server 500B becomes also enormous. In order to efficiently restrain the data capacity of uploaded image data or the capacity of image data stored in the probe storage server 500A and the navigation server 500B from becoming enormous, the acquisition need of the image is determined. In the embodiment, in a case where the illuminance around the vehicle is less than the threshold Th1, since there is a high possibility that, even though an image is acquired, the image shows nothing, it is assumed that an image is not acquired.

In a case where the detected illuminance around the vehicle is less than the threshold Th1, the acquisition need determination unit 160 determines that acquisition of the image in front of the intersection by the camera 200 is not needed, strictly selects an image uploaded to the probe storage server 500A and the navigation server 500B, and efficiently restrains the data capacity of uploaded image data or the capacity of image data stored in the probe storage server 500A and the navigation server 500B from becoming enormous.

In a case where the acquisition need determination unit 160 determines that acquisition of the image in front of the intersection is needed, the imaging controller 170 causes the camera 200 to perform imaging and acquires the image in front of the intersection. The image in front of the intersection is an image of a sign, a signboard, or the like in front of the intersection in probe data (position data, data such as the degree of congestion, a vehicle speed, and images that can be obtained when the vehicle 10 travels actually) collected by the probe traffic information collection function.

In a case where the illuminance around the vehicle detected by the illuminometer 200A is less than the threshold Th2, the imaging controller 170 extracts a high brightness portion image including a portion of a pixel having brightness equal to or greater than the predetermined value in the image acquired from the camera 200.

In a case where the high brightness portion image is extracted, and the headlight 350A is turned on when the camera 200 captures an image, the imaging controller 170 extracts a portion irradiated with the headlight 350A as a mask image from the high brightness portion image using data representing an irradiation range of the headlight 350A within a visual field of the camera 200.

For this reason, in the embodiment, image data output from the imaging controller 170 to the communication controller 180 is one of image data representing the image itself (not subjected to processing, such as extraction) acquired from the camera 200, image data representing the high brightness portion image, and image data representing the mask image.

The communication controller 180 causes the DCM 300 to transmit the image in front of the intersection acquired by the imaging controller 170 to the probe storage server 500A. The communication controller 180 is an example of a transmission controller.

The memory 190 stores the map data, the image transmission program, the image transmission method, data needed for executing the image transmission program and the image transmission method, and the like. The memory 190 is an example of a storage unit.

The camera 200 is an example of an imaging unit that images surroundings of the vehicle 10 to acquire an image. The camera 200 has an illuminometer 200A. A single or a plurality of cameras 200 may be provided as long as images of in front of the vehicle 10 can be acquired.

The DCM 300 is an example of a communication unit or a wireless communication device that is mounted in the vehicle 10, and for example, performs wireless communication through a communication line, such as 3G, LTE, 4G, or 5G. The DCM 300 can be connected to a network 400, such as the Internet, through the above-described communication line. With this, the navigation ECU 100 can perform data communication through the network 400. As an example, hereinafter, it is assumed that the DCM 300 performs wireless communication through 4G.

The headlight ECU 350 performs control for turning on or off the headlight 350A and control of a high beam or a low beam according to the illuminance around the vehicle acquired from the illuminometer 200A. The illuminance around the vehicle acquired from the illuminometer 200A is high in the daytime (unless the weather is severe), and is low in the nighttime. The illuminance around the vehicle acquired from the illuminometer 200A becomes illuminance around the vehicle by an illumination, a headlight of another vehicle, or the like at a place, such as a tunnel or an indoor parking lot.

Here, although a form in which the headlight ECU 350 automatically performs the control for turning on or off of the headlight 350A or the control of the high beam or the low beam according to the illuminance around the vehicle acquired from the illuminometer 200A has been described, the function of automatically performing the control may not be provided. In this case, the headlight ECU 350 performs switching of turning on or off of the headlight 350A and switching of the high beam or the low beam according to an operation of the user of the vehicle 10. The headlight 350A may be various types, such as a type using a light emitting diode (LED), a xenon headlight, and a halogen headlight.

The probe storage server 500A is a server that collects and stores the probe data uploaded from the navigation ECU 100 of the vehicle 10 through the DCM 300. The probe storage server 500A has a controller 510A, a communication unit 511A, a probe controller 512A, and a signboard guide creation unit 513A. The probe storage server 500A is connected to a traveling database (DB) 600A. The probe storage server 500A is an example of an image processing device.

The controller 510A is implemented by a computer including a CPU, a RAM, a ROM, an HDD, an input/output interface, a communication interface, an internal bus, and the like. The communication unit 511A, the probe controller 512A, and the signboard guide creation unit 513A of the controller 510A represent the functions of the program executed by the controller 510A as functional blocks.

The communication unit 511A is a communication interface that is connected to the network 400. The probe storage server 500A is connected to the network 400 through the communication unit 511A, and performs wireless data communication with the navigation ECU 100 of the vehicle 10. Although one vehicle 10 is shown in FIG. 1, since there is actually a plurality of vehicles 10, the communication unit 511A performs wireless data communication with the navigation ECUs 100 of the vehicles 10.

The probe controller 512A stores the probe data (data, such as position data, the degree of congestion, the vehicle speed, and images, obtained when the vehicle 10 travels actually) uploaded from the navigation ECU 100 of the vehicle 10 in the traveling DB 600A.

The signboard guide creation unit 513A recognizes the image in front of the intersection in the probe data stored in the traveling DB 600A by the probe controller 512A through image processing, and stores the image in the signboard guide DB 600B. The signboard guide creation unit 513A stores data in a database shown in FIGS. 4B and 4C, for example.

The signboard guide creation unit 513A separately creates a database including image data acquired when the illuminance around the vehicle is equal to or greater than the threshold Th2 (in the daytime or as light as the daytime) and a database including image data acquired when the illuminance around the vehicle is less than the threshold Th2 (in the nighttime or as dark as the nighttime). The signboard guide creation unit 513A also stores images included solely in the database including image data acquired when the illuminance around the vehicle is less than the threshold Th2 (in the nighttime or as dark as the nighttime) in the database including image data acquired when the illuminance around the vehicle is equal to or greater than the threshold Th2 (in the daytime or as light as the daytime). The function of the signboard guide creation unit 513A described above will be described below referring to FIG. 7.

The navigation server 500B is a serves that searches for a route and calculates a predicted arrival time according to a request from the navigation ECU 100 of the vehicle 10, and that transmits data of the searched route, the predicted arrival time, and the image in front of the intersection included in the searched route to the navigation ECU 100 of the vehicle 10.

The navigation server 500B has a controller 510B, a communication unit 511B, a route search unit 512B, and a route guidance unit 513B.

The controller 510B is implemented by a computer including a CPU, a RAM, a ROM, an HDD, an input/output interface, a communication interface, an internal bus, and the like. The communication unit 511B, the route search unit 512B, and the route guidance unit 513B of the controller 510B represent the functions of the program executed by the controller 510B as functional blocks.

The communication unit 511B is a communication interface that is connected to the network 400. The navigation server 500B is connected to the network 400 through the communication unit 511B, and performs wireless data communication with the navigation server 500B and the navigation ECU 100 of the vehicle 10. Although the single vehicle 10 is shown in FIG. 1, since there is actually a plurality of vehicles 10, the communication unit 511B performs wireless data communication with the navigation ECUs 100 of the vehicles 10.

The route search unit 512B performs communication with the navigation ECU 100 of the vehicle 10, and searches for the route and calculates the predicted arrival time based on information of a destination or the like transmitted from the route search unit 140 and the position data. The route search unit 512B transmits data representing the searched route and the calculated predicted arrival time to the navigation ECU 100 of the vehicle 10.

The route guidance unit 513B reads data of the image in front of the intersection associated with a node included in the searched route from the signboard guide DB 600B, and transmits the read data to the navigation ECU 100 of the vehicle 10 along with data representing the searched route and the calculated predicted arrival time.

Figure 2:
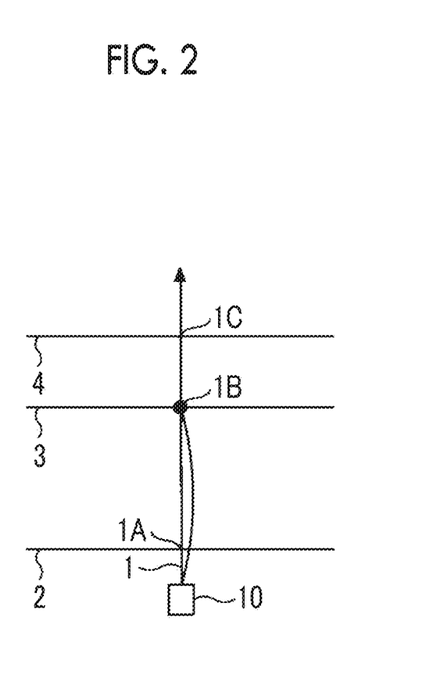
FIG. 2 is a diagram showing the positional relationship of roads, intersections, and a gas station.

A way of acquiring the image in front of the intersection will be described. FIG. 2 is a diagram showing the positional relationship of roads, intersections, and a gas station. FIG. 2 schematically shows display on the display of the navigation system. Here, as an example, the vehicle 10 is traveling in a left-hand traffic country or area.

In FIG. 2, the vehicle 10 is moving in a direction (upward direction in the drawing) indicated by an arrow along a road 1. In the moving direction of the vehicle 10, there are roads 2, 3, 4 that cross the road 1. The road 1 and the roads 2, 3, 4 cross each other at intersections 1A, 1B, 1C. The roads 1, 2, 3, 4 are represented by links of the map data, and have unique IDs, respectively. The intersections 1A, 1B, 1C are represented by nodes of the map data, and have unique IDs, respectively.

As an example, in case where the vehicle 10 approaches a position 300 m in front of an intersection, an image transmission device 100 of the vehicle 10 calculates a distance to the intersection based on the latitude and longitude of a node representing the intersection and the latitude and longitude representing a current position of the vehicle 10. The detection of the intersection and the calculation of the distance are performed by the intersection detection unit 130. Here, although a case where the image transmission device 100 determines the need for image acquisition in front of the intersection 1B has been described, the same applies to the intersections 1A, 1C.

Figure 3A:
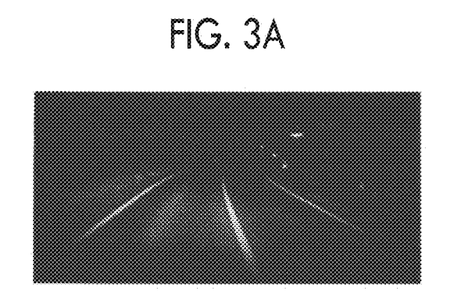
FIG. 3A is a diagram showing an example of an image acquired by an imaging controller.

FIGS. 3A to 3E are diagrams showing an example of an image acquired by the imaging controller 170. FIG. 3A shows an image acquired during traveling on the road 1 toward the intersection 1B in the nighttime. The image of FIG. 3A is an image acquired when illuminance around the vehicle is less than the threshold Th1. Here, for convenience of description, although the image acquired when the illuminance around the vehicle is less than the threshold Th1 is shown in FIG. 3A, since the imaging controller 170 does not acquire an image in a case where the illuminance around the vehicle is less than the threshold Th1, a dark image shown in FIG. 3A is not acquired.

Figure 3B:
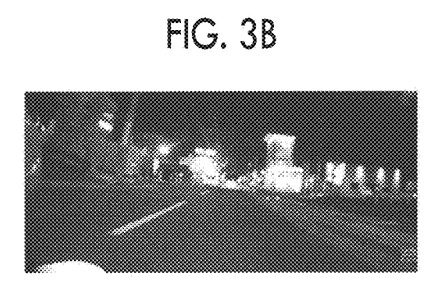
FIG. 3B is a diagram showing an example of an image acquired by the imaging controller.

FIG. 3B shows an image acquired during traveling on the road 1 toward the intersection 1B in the nighttime. The image of FIG. 3B is an image acquired in a case where the illuminance around the vehicle is equal to or greater than the threshold Th1. For this reason, a street irradiated with a streetlight, a neon sign, or the like of an urban area is reflected on an upper right side of the image. For example, the imaging controller 170 acquires the image shown in FIG. 3B. The image shown in FIG. 3B is an image acquired in a state in which the illuminance is less than the threshold Th2.

Figure 3C:
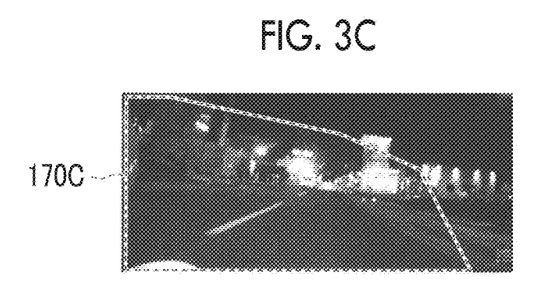
FIG. 3C is a diagram showing an example of an image acquired by the imaging controller.

FIG. 3C shows a high brightness portion image obtained by extracting a high brightness portion including a portion of a pixel having brightness equal to or greater than a predetermined value from the image shown in FIG. 3B. The high brightness portion image is a portion surrounded by a frame 170C, and the outside of the frame 170C may be cut or a pixel value outside the frame 170C may be set to zero (black).

Figure 3D:
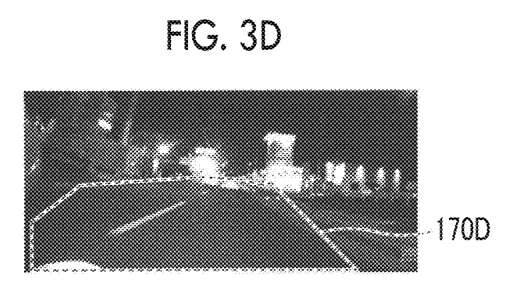
FIG. 3D is a diagram showing an example of an image acquired by the imaging controller.

FIG. 3D shows a mask image from the high brightness portion image (the image inside the frame 170C) shown in FIG. 3C. The mask image shown in FIG. 3D is obtained by extracting a portion (the inside of a frame 170D) included in the irradiation range of the headlight 350A from the high brightness portion image (the image inside the frame 170C) shown in FIG. 3C using data representing the irradiation range of the headlight 350A within the visual field of the camera 200 as a mask image. The mask image described above is an example of an irradiation range image. The outside of the frame 170D may be cut or a pixel value outside the frame 170D may be set to zero (black).

Figure 3E:
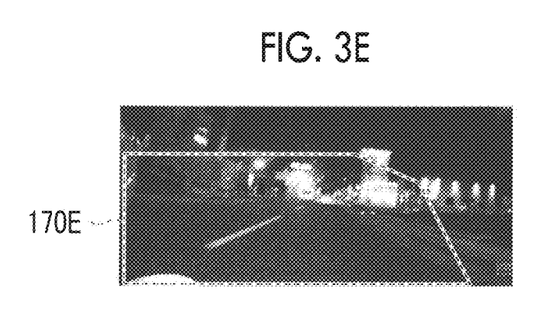
FIG. 3E is a diagram showing an example of an image acquired by the imaging controller.

FIG. 3E shows another mask image obtained from the high brightness portion image (the image inside the frame 170C) shown in FIG. 3C. The mask image shown in FIG. 3E is obtained by extracting a portion of a range between the ground and a predetermined height position from the ground within the visual field of the camera 200 from the high brightness portion image (the image inside the frame 170C) as a mask image. For this reason, the mask image shown in FIG. 3E is obtained by cutting an upper side above the predetermined height position from the high brightness portion image (the image inside the frame 170C) shown in FIG. 3C, and is a portion surrounded by a frame 170E. The mask image described above is an example of a partial irradiation range image. The outside of the frame 170E may be cut or a pixel value outside the frame 170E may be set to zero (black).

The predetermined height position is a position where the height in a vertical direction from the ground is a predetermined height, and the predetermined height is, for example, 3 m. The reason that the predetermined height is set to 3 m is because there is a sign or a signboard at the height. In extracting the portion of the range between the ground and the predetermined height position from the ground as a mask image, data representing the portion of the range between the ground and the predetermined height position from the ground within the visual field of the camera 200 may be used.

Figure 4A:
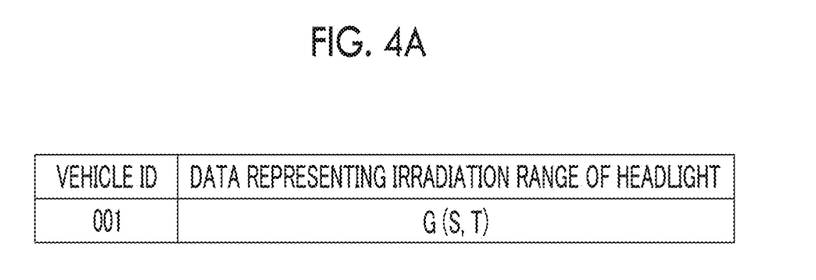
FIG. 4A is a diagram showing data related to an image transmission device.
Figure 4B:
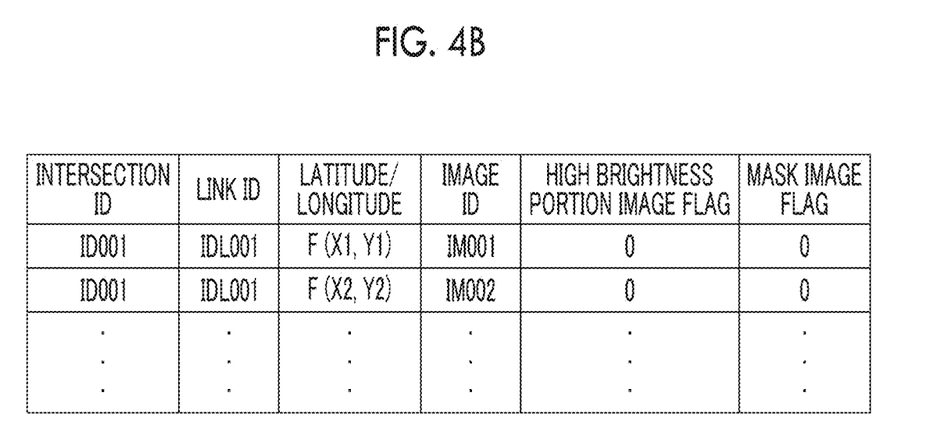
FIG. 4B is a diagram showing data related to an image transmission device.
Figure 4C:
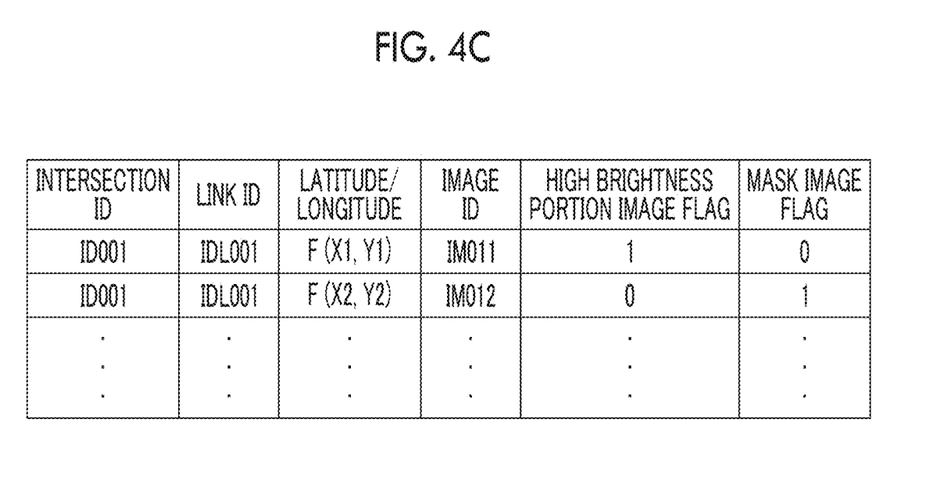
FIG. 4C is a diagram showing data related to an image transmission device.

FIGS. 4A to 4C are diagrams showing data related to the image transmission device 100. FIG. 4A shows data representing the irradiation range of the headlight 350A within the visual field of the camera 200. Data shown in FIG. 4A is stored in the memory 190 of the image transmission device 100. FIGS. 4B and 4C show the data structure of a database stored in the signboard guide DB 600B.

Data G (S, T) representing the irradiation range of the headlight 350A shown in FIG. 4A is associated with an ID (001) of the vehicle 10. Data G (S, T) represents the irradiation range of the headlight 350A within the visual field of the camera 200. Data G (S, T) shows the range of the frame 170D shown in FIG. 3D.

As shown in FIGS. 4B and 4C, the database stored in the signboard guide DB 600B is a database having an intersection ID, a link ID, a latitude/longitude, an image ID, a high brightness portion image flag, and a mask image flag associated with one another.

The intersection ID is an ID of an intersection (node) included in the map data. The link ID is an ID of a road (link) included in the map data. The latitude/longitude represents the latitude and longitude of each intersection. The image ID indicates an ID of an image acquired for each intersection.

The high brightness portion image flag is a flag indicating that an image is a high brightness portion image, is set to 1 in a case where an image is a high brightness portion image, and is set to 0 in a case where an image is not a high brightness portion image. The mask image flag is a flag indicating that an image is a mask image, is set to 1 in a case where an image is a mask image, and is set to 0 in a case where an image is not a mask image.

The database shown in FIG. 4B includes image data acquired when the illuminance around the vehicle is equal to or greater than the threshold Th2 (in the daytime or as light as the daytime). The database shown in FIG. 4C includes image data acquired when the illuminance around the vehicle is less than the threshold Th2 (in the nighttime or as dark as the nighttime).

For this reason, images having image IDs IM001, IM002 shown in FIG. 4B are images themselves (not subjected to processing, such as extraction) acquired from the camera 200. An image having an image ID IM011 shown in FIG. 4C is a high brightness portion image, and an image having an image ID IM012 is a mask image. As described above, the database (FIG. 4B) including image data acquired when the illuminance around the vehicle is equal to or greater than the threshold Th2 (in the daytime or as light as the daytime) and the database (FIG. 4C) including image data acquired when the illuminance around the vehicle is less than the threshold Th2 (in the nighttime or as dark as the nighttime) are separately provided.

When the image transmission device 100 determines that acquisition of an image is needed, image data representing an acquired image is stored in the memory 190 as a part of the probe data, is uploaded to the probe storage server 500A, and is stored in the navigation server 500B.

Figure 5:
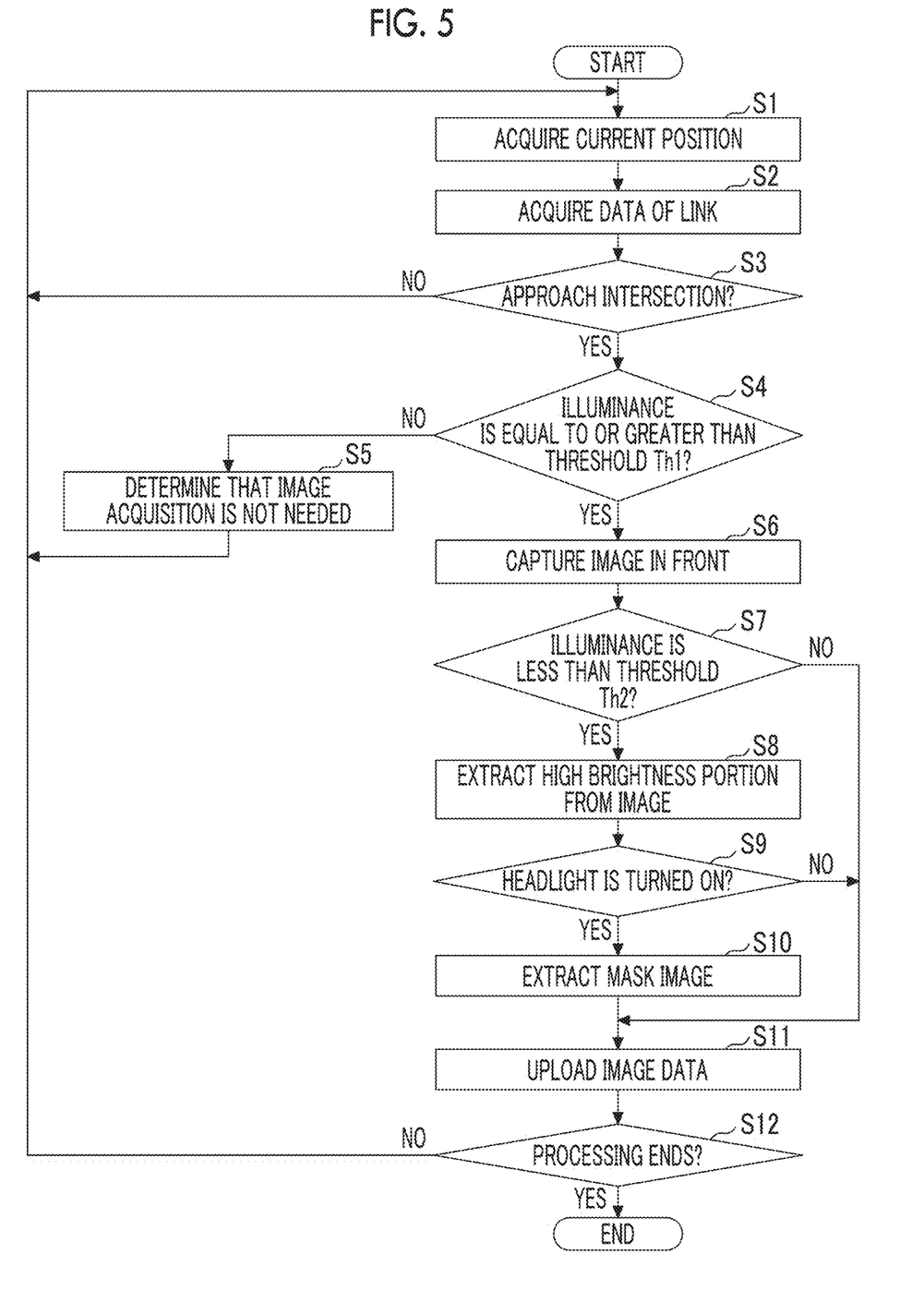
FIG. 5 is a flowchart showing processing that is performed by an image transmission device.

FIG. 5 is a flowchart showing processing that is performed by the image transmission device 100. The flowchart shown in FIG. 5 represents the processing of the image transmission program and the image transmission method of the embodiment.

As an example, in a case where an ignition switch is turned on, the main controller 110 starts the processing (START).

The position detection unit 120 acquires the current position of the vehicle 10 (Step S1).

The main controller 110 acquires data of a link (road) including the current position of the vehicle 10 (Step S2).

The intersection detection unit 130 determines whether or not the vehicle 10 approaches an intersection in the moving direction (Step S3). Determination about whether or not the vehicle 10 approaches the intersection may be performed by acquiring the position (latitude, longitude) of the intersection (node) in the moving direction from the map data, calculating the distance between the current position of the vehicle 10 and the intersection, and determining whether or not the distance between the current position and the intersection is equal to or shorter than 300 m.

In a case where the intersection detection unit 130 determines that the vehicle 10 approaches the intersection (S3: YES), the acquisition need determination unit 160 determines whether or not the illuminance around the vehicle acquired from the illuminance acquisition unit 150 is equal to or greater than the threshold Th1 (Step S4).

In a case where determination is made that illuminance around the vehicle is not equal to or greater than the threshold Th1 (S4: NO), the acquisition need determination unit 160 determines that acquisition of an image is not needed (Step S5). In a case where the processing of Step S5 ends, the main controller 110 returns the flow to Step S1. With this, in a case where the illuminance around the vehicle is less than the threshold Th1, an image is not acquired, and it is possible to efficiently restrain the data capacity uploaded to the probe storage server 500A. Here, although the determination processing like Step S5 is provided, the flow may be returned to Step S1 without performing the processing of Step S5.

In a case where determination is made that the illuminance around the vehicle is equal to or greater than the threshold Th1 (S4: YES), the acquisition need determination unit 160 determines that acquisition of an image is needed, and causes the imaging controller 170 to acquire an image (Step S6). With this, the camera 200 images in front of the vehicle 10.

Next, the imaging controller 170 determines whether or not the illuminance around the vehicle acquired from the illuminance acquisition unit 150 is less than the threshold Th2 (Step S7). The threshold Th2 is the boundary value of illuminance between daytime and nighttime. In Step S7, the imaging controller 170 attaches the high brightness portion image flag set to 1 and the mask image flag set to 0 to the image (original image) acquired in Step S6.

In a case where determination is made that the illuminance around the vehicle is less than the threshold Th2 (S7: YES), the imaging controller 170 extracts a high brightness portion image including a portion of a pixel having brightness equal to or greater than a predetermined value from the image (original image) acquired in Step S6 (Step S8).

In Step S8, the imaging controller 170 rewrites the high brightness portion image flag attached to the original image to 1. With this, the high brightness portion image flag set to 1 and the mask image flag set to 0 are attached to the high brightness portion image generated in Step S8.

Next, the imaging controller 170 determines whether or not the headlight 350A is turned on (Step S9). This is to determine whether or not to create a mask image.

In a case where determination is made that the headlight 350A is turned on (S9: YES), the imaging controller 170 extracts a mask image from the high brightness portion image extracted in Step S8 (Step S10). As an example, the mask image is a mask image included in the irradiation range of the headlight 350A shown in FIG. 3D. In Step S10, in extracting the mask image from the high brightness portion image, the imaging controller 170 rewrites the high brightness portion image flag attached to the high brightness portion image to 0, and rewrites the mask image flag attached to the high brightness portion image to 1. With this, the high brightness portion image flag set to 0 and the mask image flag set to 1 are attached to the mask image generated in Step S10.

The main controller 110 causes the communication controller 180 to upload the image to the probe storage server 500A (Step S11). In the processing of Step S11, the probe data other than the image is uploaded to the probe storage server 500A along with the image. With this, the probe storage server 500A receives the probe data from the image transmission device 100.

The main controller 110 determines whether or not to end the processing (Step S12). A case of ending the processing is, for example, when the ignition switch is turned off. In a case where the processing does not end, the main controller 110 returns the flow to Step S1. The processing described above is repeatedly performed, whereby a plurality of pieces of image data is acquired at a position 300 m in front of the intersection by the imaging controller 170.

In step S3, in a case where the intersection detection unit 130 determines that the vehicle 10 does not approach the intersection (S3: NO), the main controller 110 returns the flow to Step S1.

In Step S7, in a case where the imaging controller 170 determines that the illuminance around the vehicle is not less than the threshold Th2 (S7: NO), the main controller 110 progresses the flow to Step S11. In this case, image data representing the image itself acquired in Step S6 is uploaded to the probe storage server 500A in Step S11. The high brightness portion image flag set to 0 and the mask image flag set to 0 are attached to the image data.

In Step S9, in a case where the imaging controller 170 determines that the headlight 350A is not turned on (S9: NO), the main controller 110 progresses the flow to Step S11. In this case, image data representing the high brightness portion image acquired in Step S8 is uploaded to the probe storage server 500A in Step S11.

After determination is made in Step S5 that acquisition of an image is not needed, a message representing that an image is not acquired (for example, a message of text "the illuminance around the vehicle is not sufficient and thus an image cannot be acquired") may be generated and uploaded to the probe storage server 500A in Step S11.

Here, although the processing for creating the mask image included in the irradiation range of the headlight 350A shown in FIG. 3D has been described, a mask image of a range between the ground and a predetermined height position from the ground within the visual field of the camera 200 shown in FIG. 3E may be applied. In this case, instead of data representing the irradiation range of the headlight 350A within the visual field of the camera 200 shown in FIG. 4A, data representing the range between the ground and the predetermined height position from the ground within the visual field of the camera 200 may be used.

Figure 6:
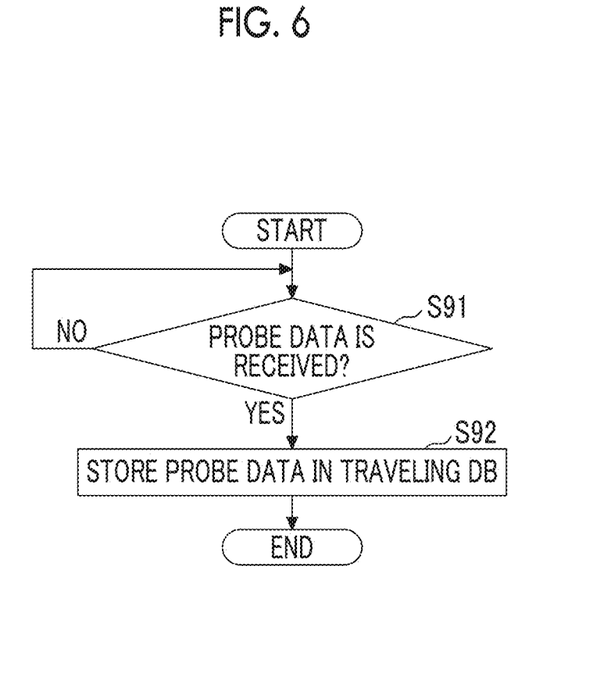
FIG. 6 is a flowchart showing processing that is performed by a probe controller of the probe storage server.

FIG. 6 is a flowchart showing processing that is performed by the probe controller 512A of the probe storage server 500A. In a case where the processing starts (START), the probe controller 512A determines whether or not the probe data is received from the image transmission device 100 (Step S91).

In a case where determination is made that the probe data is received (S91: YES), the probe controller 512A stores the probe data in the traveling DB 600A (Step S92). In a case where determination is made that the probe data is not received (S91: NO), the probe controller 512A repeatedly performs the processing of Step S91. With the above, the processing for one cycle of a control cycle ends (END). The probe controller 512A repeatedly performs the processing from START to END in a predetermined control cycle.

Figure 7:
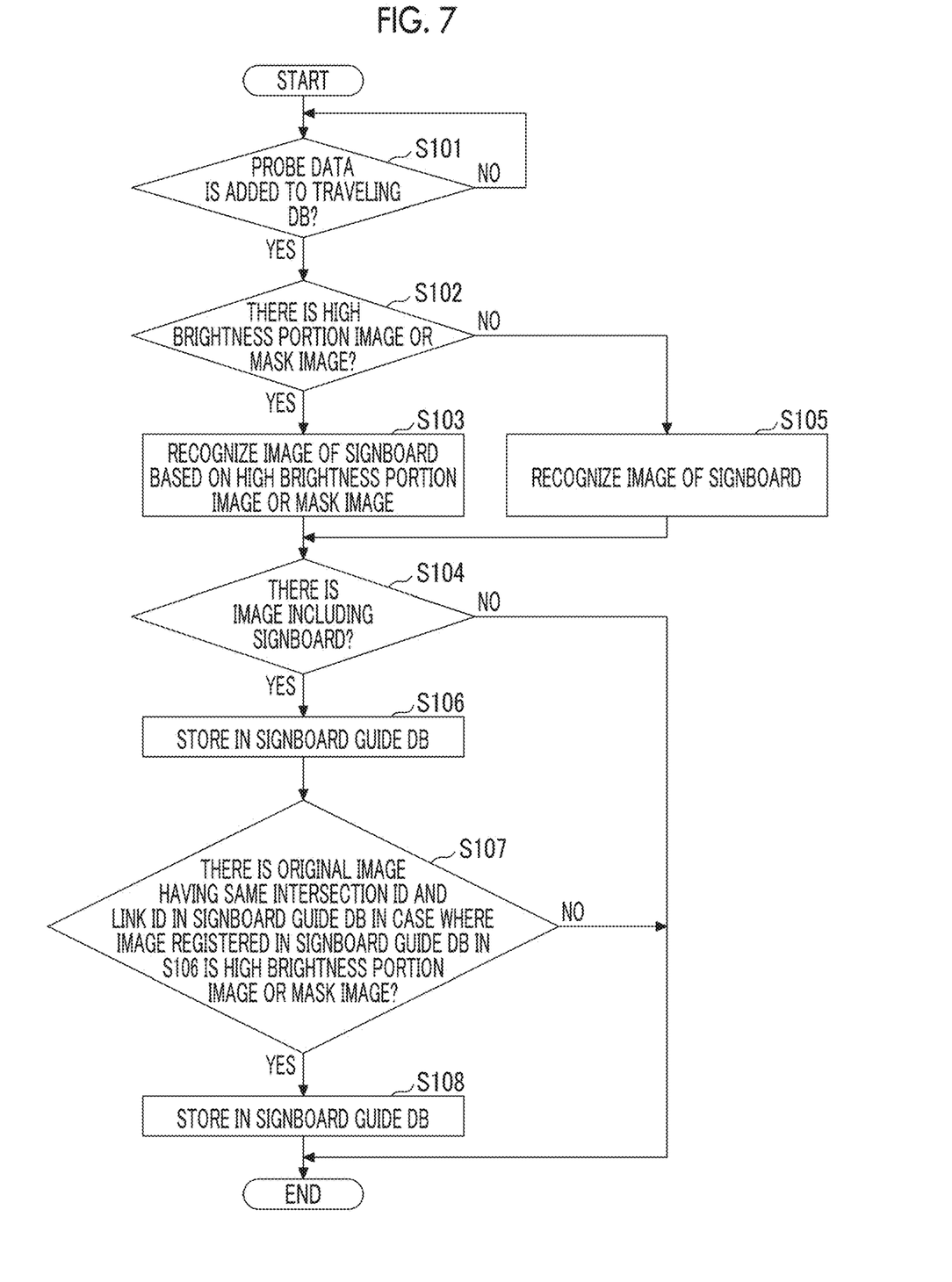
FIG. 7 is a flowchart showing processing that is performed by a signboard guide creation unit of the probe storage server.

FIG. 7 is a flowchart showing processing that is performed by the signboard guide creation unit 513A of the probe storage server 500A. In a case where the processing starts (START), the signboard guide creation unit 513A determines whether or not probe data is added to the traveling DB 600A (Step S101).

In a case where determination is made that the probe data is added (S101: YES), the signboard guide creation unit 513A determines whether or not a high brightness portion image or a mask image is included in the added data (Step S102). In regard to determination about whether or not a high brightness portion image or a mask image is included, determination may be made whether or not the high brightness portion image flag or the mask image flag attached to the image data included in the probe data is 1.

In a case where determination is made that a high brightness portion image or a mask image is included (S102: YES), the signboard guide creation unit 513A performs image recognition of a signboard to the high brightness portion image or the mask image included in the added probe data (Step S103). The image recognition of the signboard is processing for performing recognition processing (image processing) about whether or not a character, a number, or the like is included in the image data transmitted from the image transmission device 100. In Step S103, image recognition is performed to the high brightness portion image or the mask image based on an image acquired in a dark state like the nighttime.

The signboard guide creation unit 513A determines whether or not there is an image including a signboard in the processing of Step S103 (Step S104).

In a case where determination is made that there is an image including a signboard (S104: YES), the signboard guide creation unit 513A stores image data of the image it the signboard guide DB 600B along with the intersection ID, the link ID, the latitude/longitude, the image ID, the high brightness portion image flag, and the mask image flag (Step S106). With this, new data is added to the database shown in FIG. 4C.

Next, in a case where the image registered in the signboard guide DB 600B in Step S106 is a high brightness portion image or a mask image, the signboard guide creation unit 513A determines whether or not there is an original image having the same intersection ID and link ID in the database shown in FIG. 4B of the signboard guide DB 600B (Step S107).

The processing of Step S107 is a step of determining whether or not there is the same signboard as a signboard included in the high brightness portion image or the mask image in the database shown in FIG. 4B for the original image after the high brightness portion image or the mask image is registered in the signboard guide DB 600B in Step S106.

In other words, in a case where there is no same signboard as a signboard found in a dark condition like the nighttime in the database of FIG. 4B for the signboard of the original image, there is a possibility that the signboard is a self-luminous type signboard that is conspicuous in the nighttime; thus, the processing of Step S107 is a step of finding a signboard that is conspicuous in a dark condition like a self-luminous type signboard.

In a case where determination is made in Step S107 that there is the original image having the same intersection ID and link ID in the database of FIG. 4B (S107: YES), the signboard guide creation unit 513A registers the high brightness portion image or the mask image registered in the database shown in FIG. 4C of the signboard guide DB 600B in Step S106 in the database shown in FIG. 4B (Step S108).

With this, the high brightness portion image or the mask image including the signboard conspicuous in the dark condition like a self-luminous type signboard is registered in the database shown in FIG. 4B for the original image. For this reason, it is possible to add guidance of the signboard conspicuous in the dark condition like a self-luminous type signboard to the vehicle 10 traveling in a light condition like the daytime.

In a case where the signboard guide creation unit 513A ends the processing of Step S108, the processing for one cycle of a control cycle ends (END). The signboard guide creation unit 513A repeatedly performs the processing from START to END in a predetermined control cycle.

In a case where determination is made in Step S102 that the high brightness portion image or the mask image is not included (S102: NO), the signboard guide creation unit 513A performs image recognition of a signboard to the image included in the added probe data (Step S105). In Step S105, image recognition is performed to the original image acquired in the light state like the daytime. In a case where the processing of Step S105 ends, the flow progresses to Step S104.

After image recognition is performed to the original image in Step S105, in a case where determination is made in Step S104 that there is an image including a signboard (S104: YES), the signboard guide creation unit 513A registers the original image in the database shown in FIG. 4B in Step S106. In subsequent Step S107, the signboard guide creation unit 513A determines to be NO. This is because the image is not a high brightness portion image or a mask image.

In a case where determination is made in Step S104 that there is no image including a signboard (S104: NO), the signboard guide creation unit 513A ends the processing for one cycle of a control cycle (END).

According to the embodiment, in a case where the illuminance around the vehicle in front of the intersection in the moving direction of the vehicle 10 is less than the threshold Th1, determination is made that acquisition of an image is not needed. For this reason, acquisition of an image is restrained in a situation in which the illuminance around the vehicle is not sufficient, it is possible to efficiently restraining the data capacity of uploaded image data or the capacity of image data stored in the probe storage server 500A and the navigation server 500B from becoming enormous.

Accordingly, it is possible to provide a non-transitory storage medium storing an image transmission program and an image transmission device 100 capable of efficiently collecting an image at an intersection.

In a case where the illuminance around the vehicle is equal to or greater than the threshold Th1 in front of the intersection, an image is acquired, and in a case where the illuminance around the vehicle is less than the threshold Th2 that is the boundary value of illuminance between daytime and nighttime (as dark as the nighttime), the data capacity is reduced to the high brightness portion image or the mask image in the original image, and then, the high brightness portion image or the mask image is uploaded. Accordingly, it is possible to efficiently restrain the data capacity of uploaded image data or the capacity of image data stored in the probe storage server 500A and the navigation server 500B from becoming enormous.

Accordingly, the data capacity of an image acquired in the dark condition like the nighttime is further reduced and the image is uploaded, whereby it is possible to provide a non-transitory storage medium storing an image transmission program and the image transmission device 100 capable of efficiently collecting an image at an intersection.

The high brightness portion image or the mask image including the signboard conspicuous in the dark condition like a self-luminous type signboard is registered in the database shown in FIG. 4B for the original image. Accordingly, it is possible to add guidance of a signboard conspicuous in the dark condition like a self-luminous type signboard to the vehicle 10 traveling hi the light condition like the daytime, and to further improve safety daring traveling of the vehicle 10.

Although a form in which the route search unit 140 displays the signboard guide image received from the navigation server 500B on the side of the image of the intersection on the display of the navigation system has been described above, the following may be performed instead of displaying the signboard guide image of in addition to displaying the signboard guide image. The navigation server 500B may perform at least one of image processing and character recognition processing to the signboard guide image to identify a facility name or the like represented by the signboard guide image and may display the identified facility name or the like on the display or read out the facility name through voice guidance.

Although the non-transitory storage medium storing the image transmission program, the image transmission method, the in-vehicle device, the vehicle, and the image processing system according to the exemplary embodiment of the present disclosure have been described above, the present disclosure is not limited to the embodiment that is specifically disclosed, and various modifications or alterations can be made without departing from the spirit and scope of the present disclosure.

In the non-transitory storage medium storing the image transmission program according to another embodiment of foe present disclosure, the image acquisition step of the image transmission program may include processing for, in a case where the illuminance is equal to or greater than a first threshold at the position in front of the intersection by the predetermined distance, acquiring the image which the imaging unit acquires as the intersection image.

For this reason, an image captured in a case where the illuminance around the vehicle is equal to or greater than the first threshold is acquired.

Accordingly, it is possible to provide a non-transitory storage medium storing an image transmission program capable of efficiently collecting an image at an intersection by acquiring an image captured in a case where the illuminance around the vehicle is equal to or greater than the first threshold.

In the non-transitory storage medium storing the image transmission program according to still another embodiment of the present disclosure, the image acquisition step of the image transmission program may include processing for, in a case where the illuminance is equal to or greater than the first threshold and less than a second threshold higher than the first threshold at the position in front of the intersection by the predetermined distance, extracting a high brightness portion image including a high brightness portion as a portion having brightness equal to or greater than a predetermined value from the image to acquire the high brightness portion image as the intersection image.

For this reason, in a case where the illuminance around the vehicle is equal to or greater than the first threshold and less than the second threshold higher than the first threshold, the high brightness portion image in the captured image is extracted.

Accordingly, it is possible to provide a non-transitory storage medium storing an image transmission program capable of efficiently collecting an image at an intersection by extracting a high brightness portion image in a case where the illuminance around the vehicle is equal to or greater than the first threshold and less than the second threshold higher than the first threshold.

In the non-transitory storage medium storing the image transmission program according to still another embodiment of the present disclosure, the transmission step of the image transmission program may include processing for, in a case where the illuminance is less than the first threshold, causing the communication unit to transmit a message representing non-acquisition of the intersection image to the information center.

For this reason, it is possible to check that an image is not acquired through the message. The data capacity of the message is very small compared to an image.

Accordingly it is possible to provide a non-transitory storage medium storing an image transmission program capable of efficiently collecting an image at an intersection while giving notification that an image is not acquired.

In the non-transitory storage medium storing the image transmission program according to still another embodiment of the present disclosure, the image acquisition step of the image transmission program may include processing for, in a case where a headlight of the vehicle is turned on, extracting an irradiation range image as a portion including an irradiation range of the headlight from the intersection image to acquire the irradiation range image as the intersection image.

For this reason, when the headlight is turned on, the data capacity is reduced to the portion including the irradiation range of the headlight.

Accordingly, it is possible to provide a non-transitory storage medium storing an image transmission program capable of efficiently collecting an image at an intersection by giving restriction to the irradiation range of the headlight in the acquired image.

In the non-transitory storage medium storing the image transmission program according to still another embodiment of the present disclosure, the image acquisition step of the image transmission program may include processing for, in a case where a headlight of the vehicle is turned on, extracting a partial irradiation range image as a portion of a range between a ground and a predetermined height position from the ground from the intersection image to acquire the partial irradiation range image as the intersection image.

For this reason, when the headlight is turned on, the data capacity is reduced to the partial irradiation range image of the portion between the ground and the predetermined height position from the ground.

Accordingly, it is possible to provide a non-transitory storage medium storing an image transmission program capable of efficiently collecting an image at an intersection by giving restriction to the partial irradiation range image of the headlight in the acquired image.

In the non-transitory storage medium storing the image transmission program according to still another embodiment of the present disclosure, in the image acquisition step of the image transmission program, the imaging unit may be caused to acquire the intersection image at one place or a plurality of places between the position in front of the intersection by the predetermined distance and the intersection.

For this reason, the image relating to the intersection is acquired at one place or a plurality of places between the position in front of the intersection by the predetermined distance and the intersection.

Accordingly, it is possible to provide a non-transitory storage medium storing an image transmission program capable of efficiently collecting an image at one intersection or a plurality of intersections in the section of the predetermined distance.

What is claimed is:

1. A non-transitory storage medium storing an image transmission program that is executed on an in-vehicle device mounted in a vehicle having a central processing unit configured to detect illuminance around the vehicle, an illuminometer configured to acquire an image of surroundings of the vehicle, and a data communication module configured to perform communication with an information center, the image transmission program comprising:
   an image acquisition step of acquiring the image which the illuminometer acquires as an intersection image based on the illuminance which the central processing unit detects at a position in front of the intersection by a predetermined distance; and a transmission step of causing the data communication module to transmit a data representing the intersection image to the information center,
   wherein the image acquisition step of the image transmission program includes processing for, in a case where the illuminance is equal to or greater than a first threshold at the position in front of the intersection by the predetermined distance, acquiring the image which the illuminometer acquires as the intersection image.

2. The non-transitory storage medium according to claim 1, wherein the image acquisition step of the image transmission program includes processing for, in a case where the illuminance is equal to or greater than the first threshold and less than a second threshold higher than the first threshold at the position in front of the intersection by the predetermined distance, extracting a high brightness portion image including a high brightness portion as a portion having brightness equal to or greater than a predetermined value from the image to acquire the high brightness portion image as the intersection image.

3. The non-transitory storage medium according to claim 1, wherein the transmission step of the image transmission program includes processing for, in a case where the illuminance is less than the first threshold, causing the data communication module to transmit a message representing non-acquisition of the intersection image to the information center.

4. The non-transitory storage medium according to claim 1, wherein the image acquisition step of the image transmission program includes processing for, in a case where a headlight of the vehicle is turned on, extracting an irradiation range image as a portion including an irradiation range of the headlight from the intersection image to acquire the irradiation range image as the intersection image.

5. The non-transitory storage medium according to claim 1, wherein the image acquisition step of the image transmission program includes processing for, in a case where a headlight of the vehicle is turned on, extracting a partial irradiation range image as a portion of a range between a ground and a predetermined height position from the ground from the intersection image to acquire the partial irradiation range image as the intersection image.

6. The non-transitory storage medium according to claim 1, wherein, in the image acquisition step of the image transmission program, the illuminometer is caused to acquire the intersection image at one place or a plurality of places between the position in front of the intersection by the predetermined distance and the intersection.

7. An image transmission method comprising:
   with an in-vehicle device mounted in a vehicle having a central processing unit configured to detect illuminance around the vehicle, an illuminometer configured to acquire an image surroundings of the vehicle, and a data communication module configured to perform communication with an information center, acquiring the image which the illuminometer acquires as an intersection image based on the illuminance which the central processing unit detects at a position in front of the intersection by a predetermined distance;

and with the in-vehicle device, causing the data communication module to transmit a data representing the intersection image to the information center, wherein acquiring the image includes processing for, in a case where the illuminance is equal to or greater than a first threshold at the position in front of the intersection by the predetermined distance, acquiring the image which the illuminometer acquires as the intersection image.

8. An in-vehicle device comprising:

a central processing unit configured to detect illuminance around a vehicle;

an illuminometer configured to acquire an image of surroundings of the vehicle;

a data communication module configured to perform communication with an information center; and a control device configured to acquire the image which the illuminometer acquires as an intersection image based on the illuminance which the central processing unit detects at a position in front of the intersection by a predetermined distance, and cause the data communication module to transmit a data representing the intersection image to the information center, wherein acquiring the image includes processing for, in a case where the illuminance is equal to or greater than a first threshold at the position in front of the intersection by the predetermined distance, acquiring the image which the illuminometer acquires as the intersection image.

9. A vehicle comprising:

a central processing unit configured to detect illuminance around the vehicle;

an illuminometer configured to acquire an image of surroundings of the vehicle;

a data communication module configured to perform communication with an information center; and an in-vehicle device including a control device, wherein the control device is configured to acquire the image which the illuminometer acquires as an intersection image based on the central processing unit detects at a position in front of the intersection by a predetermined distance, and cause the data communication module to transmit a data representing the intersection image to the information center, wherein acquiring the image includes processing for, in a case where the illuminance is equal to or greater than a first threshold at the position in front of the intersection by the predetermined distance, acquiring the image which the illuminometer acquires as the intersection image.

10. An image processing system comprising:

an in-vehicle device mounted in a vehicle, the vehicle including a central processing unit configured to detect illuminance around the vehicle, an illuminometer configured to acquire an image of surroundings of the vehicle, and a data communication module configured to perform communication with an information center, and the in-vehicle device including a first control device; and an image processing device provided in the information center, the image processing device including a second control device, wherein:

the first control device is configured to acquire the image which the illuminometer acquires as an intersection image based on illuminance which the central processing unit detects at a position in front of the intersection by a predetermined distance, and cause the data communication module to transmit a data representing the intersection image to the information center, and the second control device is configured to receive the data, and construct guide information based on the data, wherein acquiring the image includes processing for, in a case where the illuminance is equal to or greater than a first threshold at the position in front of the intersection by the predetermined distance, acquiring the image which the illuminometer acquires as the intersection image.

* * * * *

UNITED STATES PATENT AND TRADEMARK OFFICE
CERTIFICATE OF CORRECTION

PATENT NO. : 10,885,359 B2
APPLICATION NO. : 15/964920
DATED : January 5, 2021
INVENTOR(S) : Koichi Suzuki and Junichiro Igawa Page 1 of 1

It is certified that error appears in the above-identified patent and that said Letters Patent is hereby corrected as shown below:

In the Specification

In Column 5, Line(s) 58, after "turn left", delete "of" and insert --at a--, therefor.

In Column 14, Line(s) 23, after "image", delete "it" and insert --in--, therefor.

In Column 15, Line(s) 65, after "traveling", delete "hi" and insert --in--, therefor.

In Column 15, Line(s) 66, after "safety", delete "daring" and insert --during--, therefor.

In Column 16, Line(s) 25, delete "foe" and insert --the--, therefor.

Signed and Sealed this
Sixth Day of April, 2021

Drew Hirshfeld
*Performing the Functions and Duties of the
Under Secretary of Commerce for Intellectual Property and
Director of the United States Patent and Trademark Office*